United States Patent [19]

Yu et al.

[11] Patent Number: 5,748,948
[45] Date of Patent: May 5, 1998

[54] RESET SIGNAL GENERATOR

[75] Inventors: Kuo-Cheng Yu; Bao-Shiang Sun; Ching-Yi Lin, all of Hsinchu, Taiwan

[73] Assignee: Holtek Microelectronics Inc., Hsinchu, Taiwan

[21] Appl. No.: 526,850

[22] Filed: Sep. 11, 1995

[51] Int. Cl.⁶ .................... G06F 1/04; G06F 1/24
[52] U.S. Cl. ............... 395/555; 395/557; 395/182.21
[58] Field of Search ............ 395/182.21, 182.08, 395/185.08, 555, 557, 559, 652; 364/280.3; 377/107

[56] References Cited

U.S. PATENT DOCUMENTS

| | | | |
|---|---|---|---|
| 4,618,953 | 10/1986 | Daniels et al. | 371/12 |
| 5,053,943 | 10/1991 | Yokoyama | 364/200 |
| 5,440,725 | 8/1995 | Weller et al. | 395/185.08 |
| 5,513,358 | 4/1996 | Lundberg et al. | 395/750 |

*Primary Examiner*—Dennis M. Butler
*Attorney, Agent, or Firm*—Knobbe, Martens, Olson & Bear, LLP

[57] ABSTRACT

The present invention relates to a reset signal generator adapted to be used with a microprocessor for generating a reset signal to initialize the microprocessor, which includes an oscillator to generate a fixed clock signal, a counter electrically connected to the oscillator for generating a cyclic signal in response to the fixed clock signal and outputting the reset signal at an end of a period of the cyclic signal, and a clear signal generating device electrically connected to the counter and outputting a clear signal for the counter in response to an output signal from the microprocessor. The present invention ensures that when the microprocessor is abnormal or down it will be initialized by the reset signal.

23 Claims, 4 Drawing Sheets

RESET SIGNAL GENERATOR

FIELD OF THE INVENTION

The present invention relates to a signal generator, and more particularly to a reset signal generator.

BACKGROUND OF THE INVENTION

When a microprocessor works normally in a conventional device, it will keep on generating a clear signal inputted into the counter without any circuit processing to clear the count value of the counter, so as to prevent the microprocessor from being interrupted by the reset signal generated by the counter. The counter, however, should continuously count if the microprocessor is down or works irregularly, and should generate a reset signal to reset the microprocessor after a period of time when the counter overflows or achieves the default count value preset by a user.

Practically, when a microprocessor is down or works abnormally, it usually will not stop clearing the counter and will erroneously keep on outputting clear signals; the conventional device is not designed for inhibiting such an error so that the counter cannot duly generate a reset signal to initialize the microprocessor, which is a big problem in the usage of microprocessors.

FIG. 1 illustrates a conventional reset signal generator 1, which comprises an oscillator 11 and a counter 12. The counter 12 begins to count in response to a clock pulse generated by the oscillator 11 and inputted at the line A. If the microprocessor 2 works regularly, it will output a clear signal from the line C after every a period of time and clear the count value of the counter 12 to force the counter 12 to count from the beginning. If there is no clear signal inputted into the counter 12 after a period of time $T_{WDT}$, the counting of the counter 12 will be stopped and the counter 12 will output a reset signal to initialize the microprocessor 2.

The time sequence relationship of the conventional device is illustrated in FIG. 2, wherein if there is no clear signal inputted to the counter 12 from $t_0$ to $t_1$ (time period $T_{WDT}$), a reset signal will be generated at $t_1$. On the other hand, there will be no reset signal generated at $t_0$ since the counter 12 is intermittently cleared at $t_2$, $t_5$, $t_7$ and $t_{10}$, and counts from the beginning at $t_4$, $t_6$, $t_8$ and $t_{11}$ to reset the microprocessor when the microprocessor 2 is abnormal or down.

The present invention addresses the foregoing situation.

SUMMARY OF THE INVENTION

A purpose of the present invention is to design a clear signal generator which includes a logical circuit having functions of storage and logic operation for timely generating a reset signal to initialize a microprocessor when it is down or abnormal.

In accordance with the present invention, a reset signal generator which is adapted to be used with a microprocessor provides a reset signal to initialize the microprocessor. The reset signal generator includes a clock signal generating device including an oscillator to generate a fixed clock signal, a cyclic signal generating device electrically connected to the clock signal generating device, and a clear signal generating device electrically connected to the cyclic signal generating device. The cyclic signal generating device generates a cyclic signal in response to the clock signal and outputs a reset signal at an end of a period of the cyclic signal. The clear signal generating device generates a clear signal for the cyclic signal generating device in response to an output signal from the microprocessor.

The clock signal input of the cyclic signal generating device can be provided from an oscillator in the clock signal generating device that at an output end is electrically connected to the cyclic signal generating device.

The cyclic signal generating device may include a counter which is enabled to count by the fixed clock signal. The counter outputs a reset signal while there is no clear signal input after a period of time; the period of time is either a counter overflow value or a default count value preset by a user.

The clear signal generating device comprises two parts: a memory delay device and a logic operation output circuit. The memory delay device includes a latch circuit and a delay circuit. The latch circuit comprises two NOR gates for storing the output signal from the microprocessor. The delay circuit, which is electrically connected to the latch circuit for delaying the output signal of the latch circuit, is a D type flip-flop. The logic operation output circuit in the clear signal generating device, which electrically connected to the memory delay device and the cyclic signal generating device, is an XOR gate, which serves as an exclusive OR logic operation for the input signal from the memory delay device, and outputs the clear signal.

The present invention may best be understood through the following description with reference to the accompanying drawings, in which:

DETAILED DESCRIPTION OF THE PREFERRED EMBODIMENTS

Figure 1:
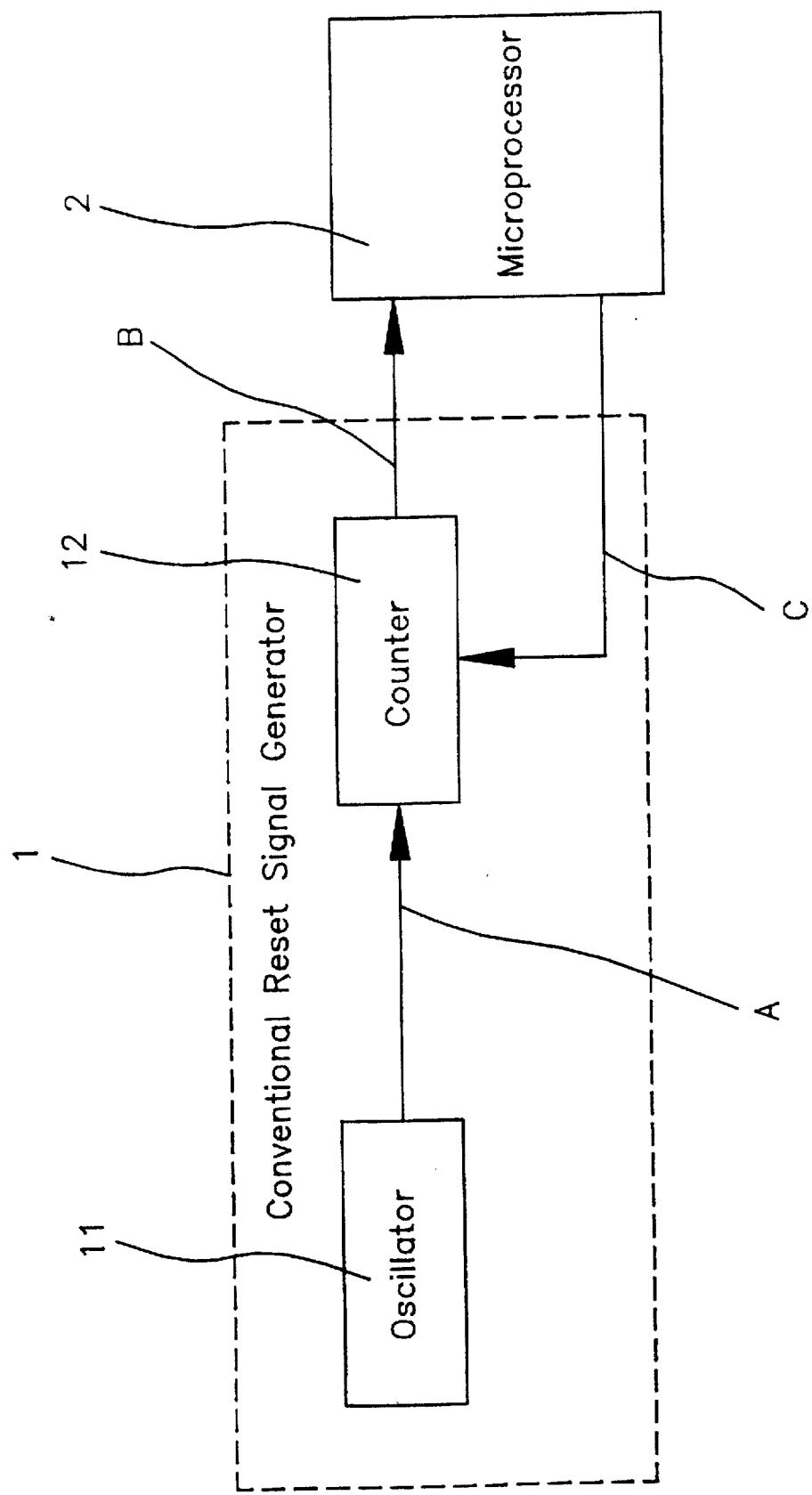
FIG. 1 is an illustrating diagram of a conventional reset signal generator.
Figure 2:
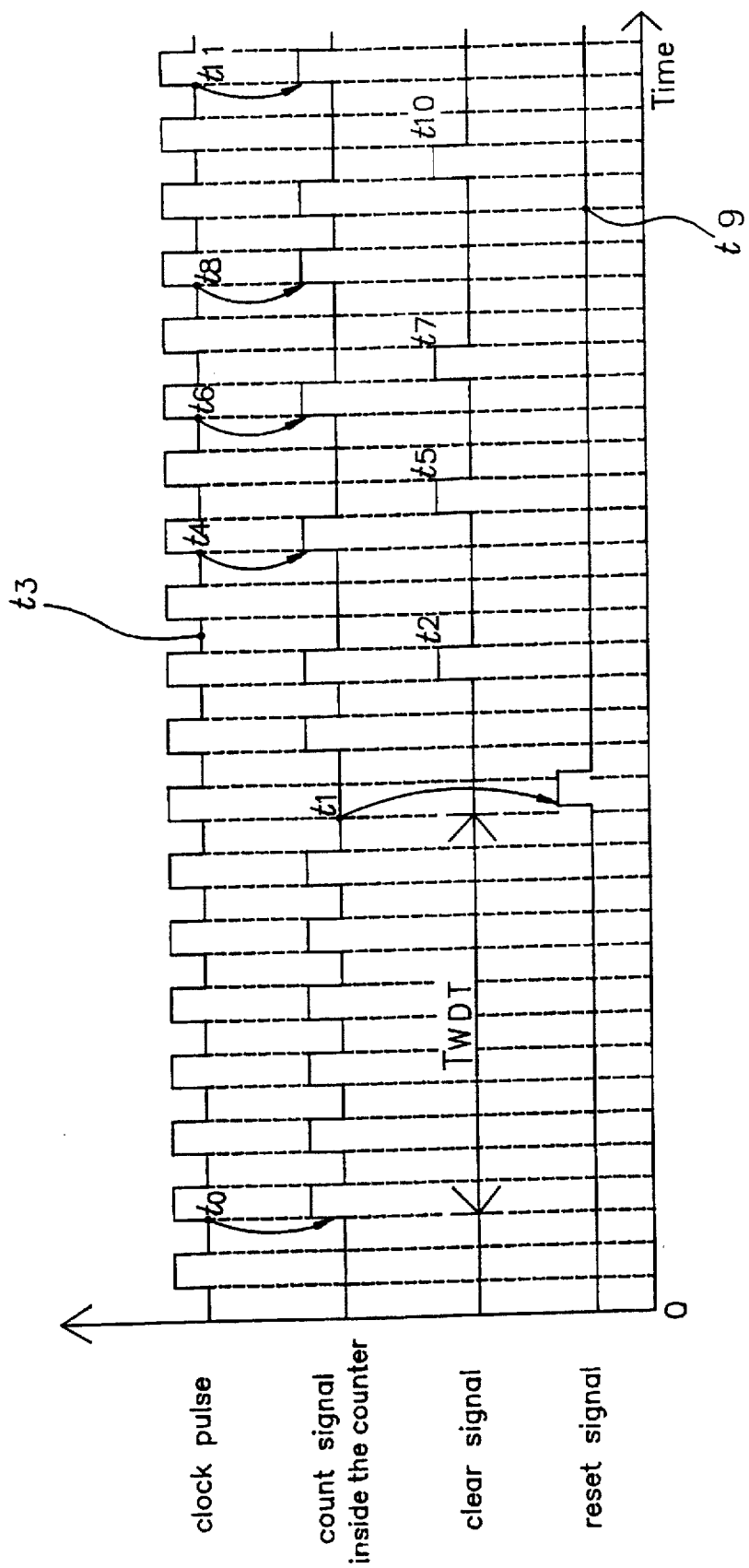
FIG. 2 illustrates a signal timing sequence diagram of a conventional reset signal generator.
Figure 3:
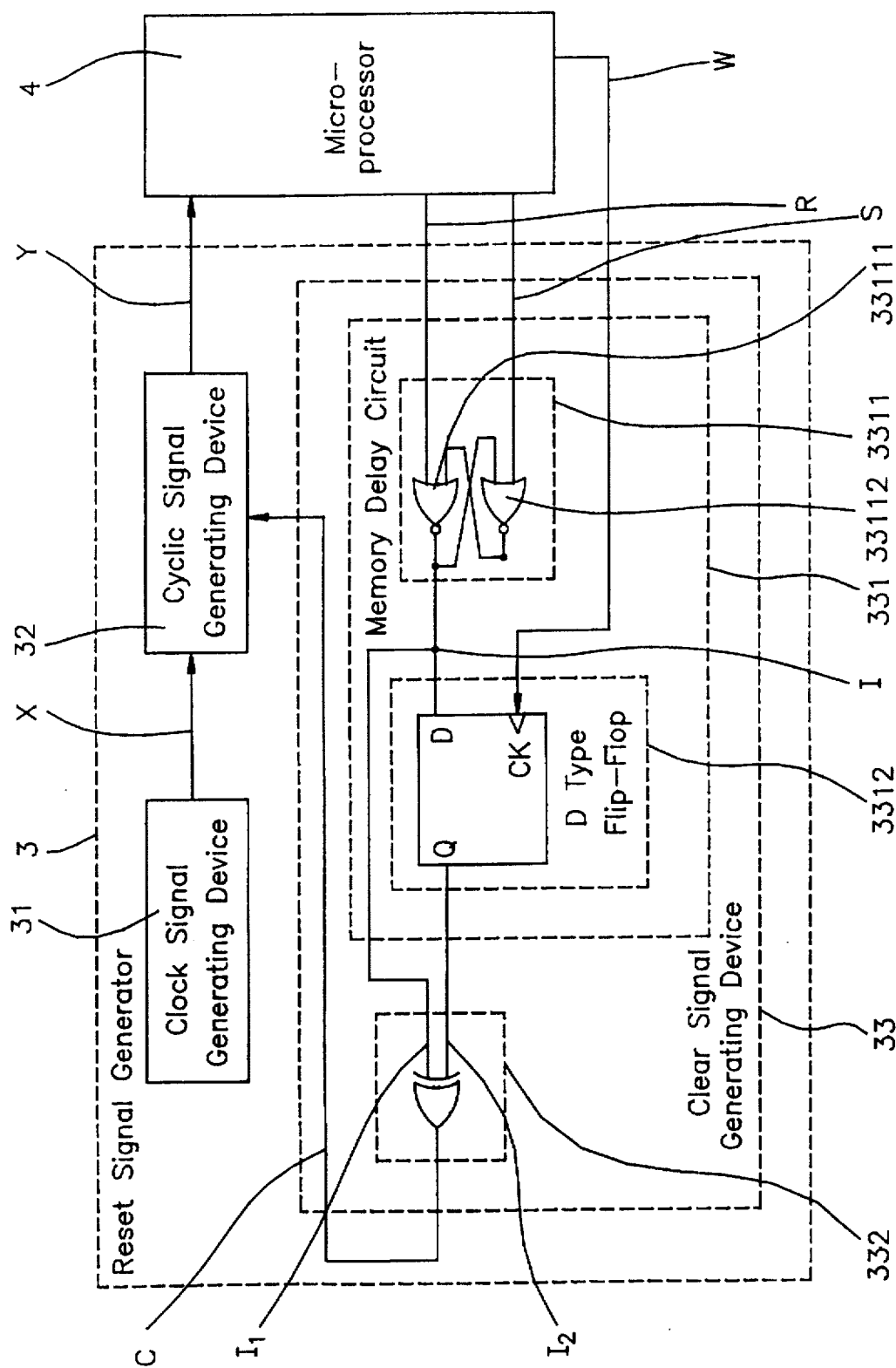
FIG. 3 is a circuit diagram of a preferred embodiment of a reset signal generator according to the present invention.

Referring to FIG. 3, there is shown a circuit diagram for illustration of the present invention, which includes a reset signal generator 3 and a microprocessor 4. The reset signal generator 3 includes a clock signal generating device (which can be an oscillator) 31, a cyclic signal generating device (which can be a counter) 32, and a clear signal generating device 33. The clear signal generating device comprises a memory delay device 331 and a logic operation output circuit (which can be an XOR gate) 332; a memory delay circuit 331 includes a latch circuit 3311 and a delay circuit (which can be a D type flip-flop) 3312, where the latch circuit 3311 includes a NOR gate 33111 and the other NOR gate 33112.

The details about how the present invention works will be described as follows:

The present invention, when compared with a conventional device, includes the addition of the clear signal generating device 33. The present invention also differs from the prior art in that the input ends S, R of the latch circuit 3311 are electrically connected to the two output ends of the microprocessor 4. Two ends S, R of the latch circuit 3311 should be inputted alternately with a high voltage pulse signal while the microprocessor 4 works normally. An input from the microprocessor 4 to one of input ends S, R of the latch circuit 3311 will show outputs at $I_1$ and $I_2$, and when the next input signal is inputted into the other input end of the latch circuit 3311, it will change the voltage level at I from high to low or from low to high. This change will arrive at $I_1$ sooner than $I_2$ due to delay of the D type flip-flop 3312, and the XOR gate 332 will generate a clear signal at the line C in response to the instantaneously changed state of signals $I_1$ and $I_2$ to clear the counter and thus inhibit generation of the reset signal.

On the other hand, when the microprocessor 4 is abnormal or down, it cannot input a high voltage pulse signal alternately into the two input ends of latch circuit 3311, thus ensuring that there will be no clear signal generated at the line C. In this case, the microprocessor 4 will be initialized to the normal situation by the reset signal from the counter 32 while its count value overflows or it achieves a default count value preset by a user.

Figure 4:
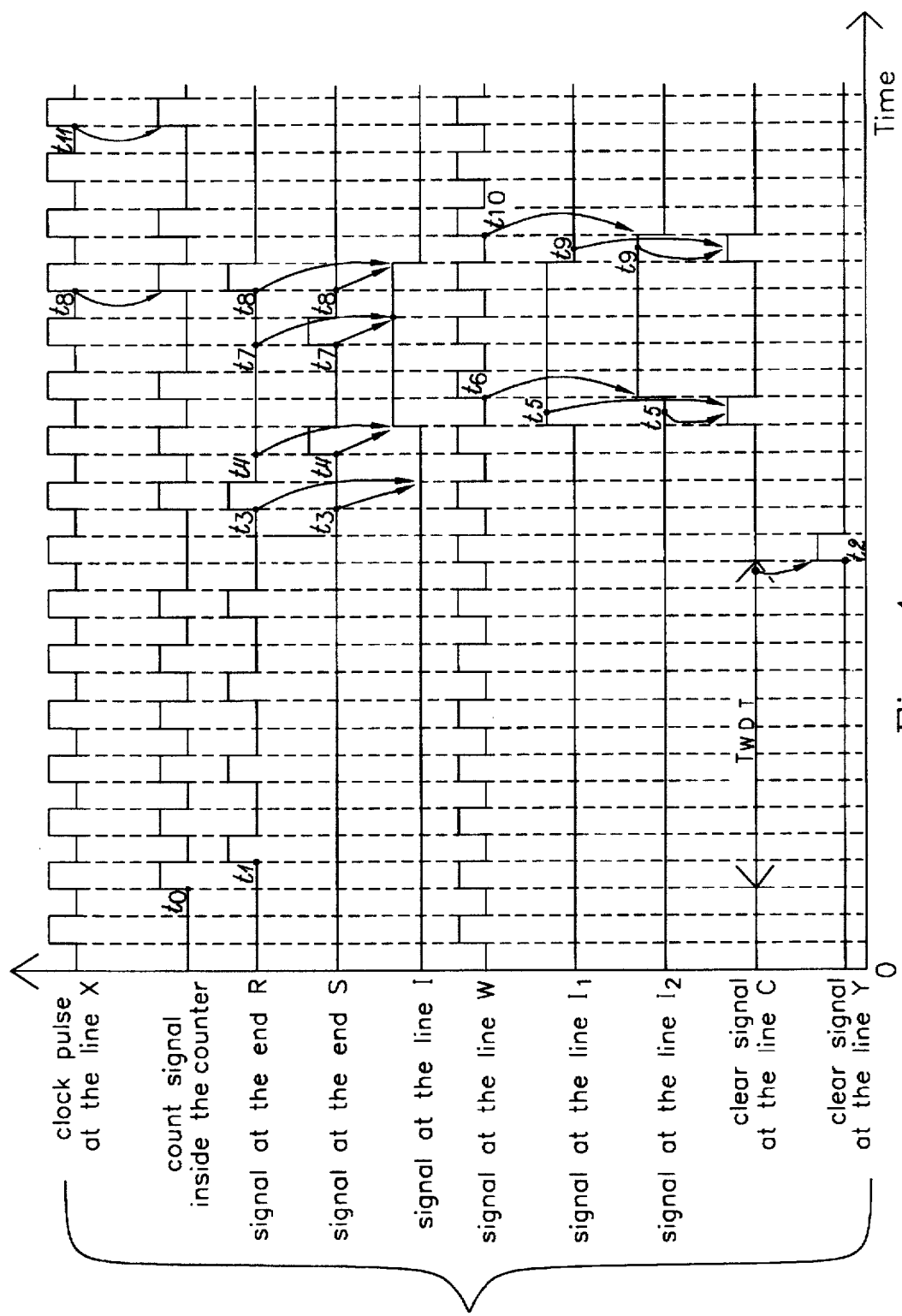
FIG. 4 illustrates a signal timing sequence diagram of a reset signal generator according to the present invention.

Simultaneously referring to FIG. 4, which is an illustration of a timing sequence diagram for the present invention, and FIG. 3 will be helpful in future understanding the present invention.

When a microprocessor 4 works irregularly from time $t_0$, and there are erroneous clear signals inputted to the input end R, the present invention ensures that there will be no clear signal at line C, and after a time period $T_{WDT}$, a reset signal will be generated at time $t_2$ to initialize the microprocessor 4. If the microprocessor 4 works regularly, when input ends R and S of latch circuit 3312 are inputted with a high voltage pulse alternately at times $t_3$ and $t_4$, there will be a clear signal generated at time $t_5$, to clear the counter 32; the same situation of times $t_3$, $t_4$ and $t_5$ can be applied at times $t_7$, $t_8$ and $t_9$, and counter 32 will reset the count value in response to the clear signals at times $t_8$ and $t_{11}$.

In addition, the operation of the D type flip-flop 3312 is controlled by the input signal from the line W, thus the signal of the line 1 will not be transferred to the line $I_2$ unless there is a high level pulse inputted to W, which can be seen from what is shown at times $t_6$ and $t_{10}$.

The embodiment described above is a preferred example of the present invention, wherein each circuit portion of the embodiment can be replaced by the other equivalent element 5 or circuit 5. For example, the counter 32 can be either an up or down counter, and can be replaced by a timer; the XOR gate can be replaced by a combination of the AND gate, the OR gate and the NOT gate or some NAND gates; the D type flip-flop also can be replaced by another type of flip-flop and some other logic gates. In other words, other preferred embodiments of the present invention can be performed depending on their cost or other factors.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A reset signal generator adapted to be used with a microprocessor providing for generating a reset signal to initialize said microprocessor, comprising:

a clock signal generating device generating a fixed clock signal;

a cyclic signal generating device electrically connected to said clock signal generating device for generating a cyclic signal in response to said clock signal, and generating and outputting said reset signal at an end of a period of said cyclic signal; and a clear signal generating device having two input ends electrically connected to two output ends of said microprocessor, respectively, and electrically connected to said cyclic signal generating device for generating a clear signal for said cyclic signal generating device in response to an output signal outputted from said microprocessor, wherein said output signal is a high voltage pulse signal alternately inputted into said two input ends of said clear signal generating device.

2. A reset signal generator according to claim 1, wherein said clock signal generating device includes an oscillator.

3. A reset signal generator according to claim 2, wherein said oscillator includes an output end electrically connected to said cyclic signal generating device for providing an oscillatory signal as a clock signal input of said cyclic signal generating device.

4. A reset signal generator according to claim 1, wherein said cyclic signal generating device includes a counter enabled to count by said fixed clock signal, and generating said reset signal output while receiving none of said clear signal input after a period of time.

5. A reset signal generator according to claim 4, wherein said period of time is a counter overflow value.

6. A reset signal generator according to claim 4, wherein said period of time is a default count value preset by a user.

7. A reset signal generator according to claim 1, wherein said clear signal generating device includes a memory delay device.

8. A reset signal generator according to claim 7, wherein said memory delay device includes a latch circuit electrically connected to said two input ends and a first line for receiving said output signal by said two input ends and changing said voltage level of said first line in response to said output signal.

9. A reset signal generator according to claim 8, wherein said latch circuit includes a logical circuit comprising two NOR gates for receiving said output signal from said two input ends, respectively, and changing said voltage level of said first line in response to said output signal.

10. A reset signal generator according to claim 8, wherein said memory delay device further includes a delay circuit electrically connected to said first line of said latch circuit for delaying a signal representing said changing of said voltage level of said first line of said latch circuit.

11. A reset signal generator according to claim 10, wherein said delay circuit is a flip-flop.

12. A reset signal generator according to claim 11, wherein said delay circuit is a D type flip-flop.

13. A reset signal generator according to claim 10, wherein said clear signal generating device further includes a logic operation output circuit electrically connected to said first line by a second line and said delay circuit by a third line for generating said clear signal for said cyclic signal generating device according to said signals at said second line and said third line, respectively, when said signal representing said changing of said voltage level of said first line arrives at said second line.

14. A reset signal generator according to claim 13, wherein said logic operation output circuit is an XOR gate.

15. A reset signal generator according to claim 13, wherein said logic operation is an exclusive OR logic operation.

16. A reset signal generator adapted to be used with a microprocessor for generating a reset signal to initialize said microprocessor, comprising:

a clock signal generating device generating a fixed clock signal;

a cyclic signal generating device electrically connected to said clock signal generating device for generating a cyclic signal in response to said clock signal, and outputting said reset signal at an end of a period of said cyclic signal;

a clear signal generating device electrically connected to said cyclic signal generating device for generating a clear signal for said cyclic signal generating device in response to said output signal, wherein said clear signal generating device includes a memory delay device having a latch circuit for storing said output signal.

17. A reset signal generator according to claim 16, wherein said latch circuit includes a logical circuit comprising two NOR gates.

18. A reset signal generator according to claim 16, wherein said memory delay device further includes a delay circuit electrically connected to said latch circuit for delaying an output signal of said latch circuit.

19. A reset signal generator according to claim 18, wherein said delay circuit is a flip-flop.

20. A reset signal generator according to claim 19, wherein said delay circuit is a D type flip-flop.

21. A reset signal generator according to claim 18, wherein said clear signal generating device further includes a logic operation output circuit electrically connected to said memory delay device and said cyclic signal generating device for logically operating said output signal of said latch circuit to generate said clear signal.

22. A reset signal generator according to claim 21, wherein said logic operation output circuit is an XOR gate.

23. A reset signal generator according to claim 21, wherein said logic operation output circuit is an OR logic operation.

* * * * *